(12) United States Patent
Schmidt (10) Patent No.: US 11,235,891 B2
(45) Date of Patent: Feb. 1, 2022

(54) LAUNCH AND LANDING PAD FOR DRONES

(71) Applicant: Louis J. Schmidt, San Pedro, CA (US)

(72) Inventor: Louis J. Schmidt, San Pedro, CA (US)

(73) Assignee: Hoodman Corporation, Torrance, CA (US)

(*) Notice: Subject to any disclaimer, the term of this patent is extended or adjusted under 35 U.S.C. 154(b) by 498 days.

(21) Appl. No.: 16/358,752

(22) Filed: Mar. 20, 2019

(65) Prior Publication Data

US 2019/0217968 A1 Jul. 18, 2019

Related U.S. Application Data

(63) Continuation-in-part of application No. 15/263,484, filed on Sep. 13, 2016, now abandoned.

(60) Provisional application No. 62/266,130, filed on Dec. 11, 2015.

(51) Int. Cl.
  *B64F 1/00* (2006.01)
  *B64F 1/04* (2006.01)
  *B64C 39/02* (2006.01)

(52) U.S. Cl.
  CPC .............. *B64F 1/007* (2013.01); *B64C 39/02* (2013.01); *B64C 39/024* (2013.01); *B64F 1/00* (2013.01); *B64F 1/04* (2013.01); *B64C 2201/18* (2013.01)

(58) Field of Classification Search
  CPC .......... B60J 1/2091; B60J 11/00; B60J 11/08; B64F 1/007; A63B 2210/54; A63B 19/00; A63H 33/18; A63F 3/0023; A47G 9/062
  USPC ..................................................... 244/110 E
  See application file for complete search history.

(56) References Cited

U.S. PATENT DOCUMENTS

| 3,862,876 | A | 1/1975 | Graves |
| 4,709,430 | A | 12/1987 | Nicoll |
| 4,709,928 | A | 12/1987 | Willingham |
| 4,832,652 | A | 5/1989 | Matsuyama |
| 4,951,333 | A | 8/1990 | Kaiser et al. |
| 5,024,262 | A | 6/1991 | Huang |
| 5,056,172 | A | 10/1991 | Kaiser et al. |

(Continued)

OTHER PUBLICATIONS ronstan.com.au (Stainless Steel Wire. Catalog [online]. Ronstan Co., 2009. [retrieved on Oct. 30, 2019]. Retrieved from the internet: <URL: https://web.archive.org/web/20090429033742/https://www.ronstan.com.au/marine5/SAwirerope.asp>) (Year: 2009).*

*Primary Examiner* — Richard R. Green
*Assistant Examiner* — Steven J Shur
(74) *Attorney, Agent, or Firm* — Fildes & Outland, P.C.

(57) ABSTRACT

A transportable launch and landing pad for drones includes a round surface member for supporting a drone on a ground surface. The surface member includes an endless flexible weighted ground surface contacting, engaging and conforming perimeter disposable on the flat or undulating topography of the ground surface. The endless flexible weighted ground surface contacting, engaging and conforming perimeter is formed of a stranded carbon steel wire rope. The surface member has a diameter establishing an area of the pad that is greater than any linear distance across an area of downwardly moving air of the drone when operated. The pad maintains a position on the ground surface without any separate securing member inserted into the ground, and the pad is not lifted from the ground surface by air from the thrust of the drone during approach and departure of the drone relative to the pad.

11 Claims, 4 Drawing Sheets

(56) References Cited

U.S. PATENT DOCUMENTS

| | | | |
|---|---|---|---|
| 5,116,273 A | 5/1992 | Chan | |
| 5,358,440 A | 10/1994 | Zheng | |
| 5,927,793 A | 7/1999 | McGrath, Jr. | |
| 6,073,283 A * | 6/2000 | Zheng | A47G 9/062 5/417 |
| 6,170,100 B1 * | 1/2001 | Le Gette | A47G 9/062 297/219.1 |
| 6,192,635 B1 * | 2/2001 | Zheng | A63B 9/00 135/126 |
| 7,082,883 B1 | 8/2006 | Arias | |

* cited by examiner

LAUNCH AND LANDING PAD FOR DRONES

CROSS REFERENCE TO RELATED APPLICATIONS

This application is a continuation-in-part of U.S. application Ser. No. 15/263,484 filed Sep. 13, 2016, which claims the priority of U.S. Provisional Application No. 62/266,130 filed Dec. 11, 2015.

TECHNICAL FIELD

This invention relates to aerial drones, and more particularly to the launch and landing of drones.

BACKGROUND OF THE INVENTION

It is known in the art relating to unmanned, flying drone vehicles (also known as unmanned aerial vehicles or unmanned aircraft systems), such as drones that are used for video and photography, that the camera is mounted beneath the drone. Upon take off, the amount of thrust created to lift the drone off the ground causes dust and debris to pummel the video/camera lens prior to the drone becoming airborne. A dirty lens greatly degrades the quality and limits the usefulness of any video or photos captured by the camera during the drone flight.

Conventional drone launch pads placed underneath the drone prior to initiation of flight may protect the camera lens from debris, and also prevent drone rotor damage from tall grass and pebble strikes. Drone launch pads also prevent dirt from being sucked through the motor bearings, which would otherwise lead to motor failure. However, conventional drone launch pads to date have been made of tarps that require stakes to be pounded into the ground to keep the pads from being blown away by or sucked into the drone propellers. Also, if the drone is launched from a cement surface, a rocky surface, or other hard surface, the stakes cannot be used to hold the launch pad tarp.

Further, conventional pads have been developed to keep a piece of material forming the body of the pad from being blown out of shape by wind that moves in a direction generally parallel to the earth's surface and that engages the pad at its outer edge. However, in addition to the wind, drone pads are subjected to the thrust that a drone exerts on the pad. Unlike the wind, a drone approaching or moving away from a pad can send thrust at angles ranging from a right angle (90 degrees) to the earth's surface all the way to a 10 degree angle to the earth's surface. This thrust factor lifts up and blows away conventional pads.

Some known mats, towels, or pads use a flat band in a circular/oval shape that is designed to resist wind moving generally parallel to the earth's surface. The flat band has no aerodynamic shape to be able to withstand thrust blowing from 90 degrees to 10 degrees relative to the earth's surface. The flat bands are not mechanical devices and are not heavy enough to hold in place when a drone flies over it. Flat bands also do not have a mechanical tensile strength factor to multiply the force exerted by the band at the point of thrust intersection with the band. Other tarps have rectangular shapes that are designed to resist wind moving parallel to the earth's surface. And some tarps or cloths have a perimeter that is filled with a liquid or granular filling, that has no mechanical tensile strength component, and which cannot withstand the thrust angles that it would be exposed to by a drone.

Additionally, at the end of a flight, a drone does not always return to the same location as the launch because its GPS system is not precise. In this case, a staked-down tarp that was used for launch cannot be moved in a timely or easy fashion to accommodate a new return landing site.

Other drone pads have been made of carpet, hard plastic, or other bulky materials. However, due to their materials of construction, these pads are not collapsible.

SUMMARY OF THE INVENTION

The present invention provides a launch and landing pad for drones that is quickly and easily deployed for use and collapsed for storage. The present pad also does not require stakes or other similar securement devices to hold the pad in place, thereby facilitating the deployment of the pad and repositioning of the pad to a different location. Additionally, the present pad is not displaced by wind or by downwardly moving air produced by the drone when the drone is operated and departs from, approaches, or otherwise passes by the pad such as during launch and/or landing.

A launch and landing pad for drones in accordance with the invention may include a surface member and an endless weighted perimeter disposed along the outer peripheral edge portion of the surface member. The weighted endless perimeter of the surface member maintains the position of the launch and landing pad while in use without a separate securing member. The weighting of the endless perimeter is beneficial to drone operators because the present launch and landing pad does not need to be staked down or secured otherwise with another device.

More particularly, a transportable launch and landing pad for drones includes a round surface member for supporting a drone on a ground surface. The surface member includes an endless flexible weighted ground surface contacting, engaging and conforming perimeter disposable on the flat or undulating (or otherwise uneven) topography of the ground surface. The endless flexible weighted ground surface contacting, engaging and conforming perimeter is formed of a stranded carbon steel wire rope. The surface member has a diameter establishing an area of the pad that is greater than any linear distance across an area of downwardly moving air of the drone when operated, also known as a thrust diameter of the drone. The pad maintains a position on the ground surface without any separate securing member inserted into the ground, and the pad is not lifted from the ground surface by air from the thrust of the drone during approach and departure of the drone relative to the pad.

A transportable launch and landing pad for drones alternatively includes a flexible base for supporting a drone on a ground surface. The base has a perimeter, and an endless frame member is joined to the perimeter of the base. The base has a surface area that has a width that is greater than any linear distance across an area of downwardly moving air of the drone when operated. The endless frame member is weighted and is formed of a stranded carbon steel wire rope. The endless frame member holds the pad in place on the ground surface, and the endless frame member is collapsible to fold the pad for storage and releasable for use of the pad.

The flexible base may have a round or elliptical shape. The flexible base may be generally planar in an unfolded use disposition, while also being conformable to any topography. The flexible base may be a textile material or a flexible plastic material. To join the endless frame member to the flexible base, the endless frame member may be retained in a pocket formed by the perimeter of the flexible base, allowing the endless frame member to flex, twist and move within the pocket. The endless frame member may be collapsible from an unfolded use disposition to a storage disposition that is a fraction of a size of the unfolded disposition.

A method of storing and deploying a transportable launch and landing pad for drones includes the steps of providing a launch and landing pad including a flexible base for supporting a drone on a ground surface, the base having a perimeter, and an endless frame member joined to the perimeter of the flexible base, the base having a surface area that has a width that is greater than any linear distance across an area of downwardly moving air of the drone when operated, the endless frame member being weighted and collapsible, and the endless frame member being formed of a stranded carbon steel wire rope; manipulating the launch and landing pad from an unfolded use disposition to a storage disposition by twisting the endless frame member and folding the twisted endless frame member over itself from a single shape into two or more smaller, similar shapes; and releasing the launch and landing pad from the folded storage disposition, whereby the endless frame member is returnable to the single shape to place the launch and landing pad in the unfolded use disposition.

Optionally, the method may include inserting the folded launch and landing pad into a storage bag. The method also may include positioning the launch and landing pad by grasping the launch and landing pad at the perimeter and tossing the launch and landing pad onto a surface. Additionally, the method may include repositioning the launch and landing pad by removing the launch and landing pad from the surface and tossing the launch and landing pad into another location.

These and other features and advantages of the invention will be more fully understood from the following detailed description of the invention taken together with the accompanying drawings.

DETAILED DESCRIPTION OF THE INVENTION

Referring now to the drawings in detail, numeral 10 generally indicates a launch and landing pad for drones in accordance with the invention. The launch and landing pad is quickly and easily deployed for use and collapsed into a compact configuration for storage, and is easily moved from one location to another. The launch and landing pad also holds itself in place without stakes or other securement devices, so that thrust from the drone or other forces (e.g., wind) does not move, tip, flip, or otherwise displace the pad during launch or landing of a drone. In addition, the pad protects against debris or other objects contacting a drone upon launch and landing of the drone.

Figure 1:
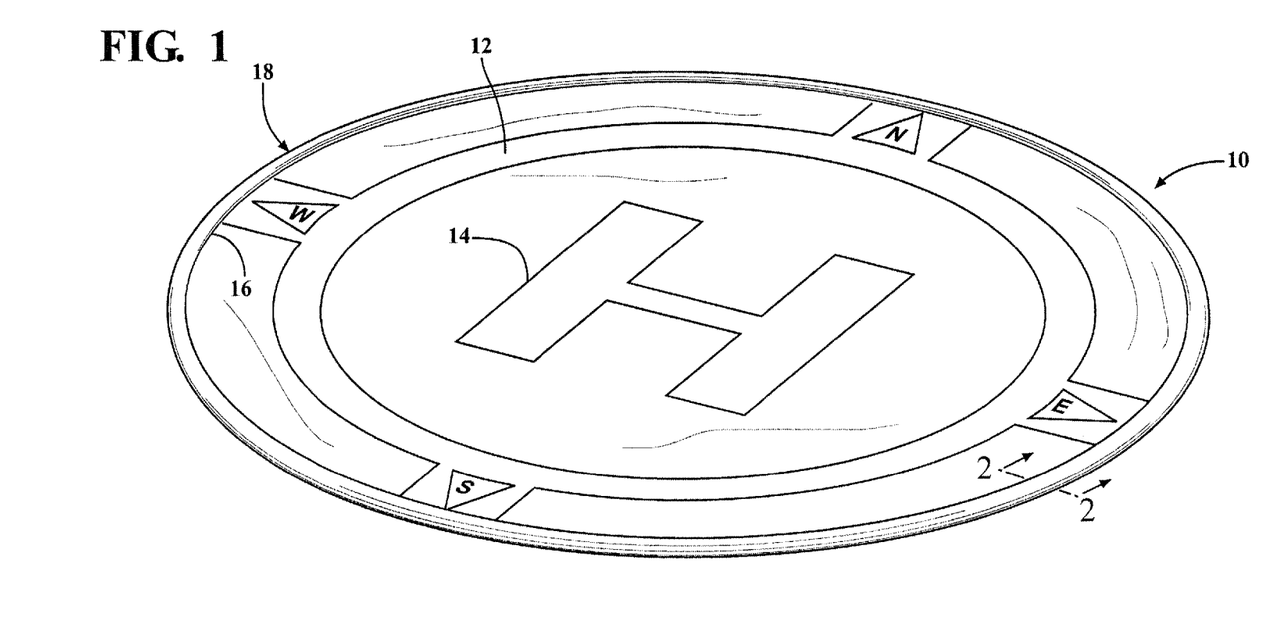
FIG. 1 is a perspective view of a launch and landing pad for drones in accordance with the invention in an unfolded, use disposition.
Figure 2:
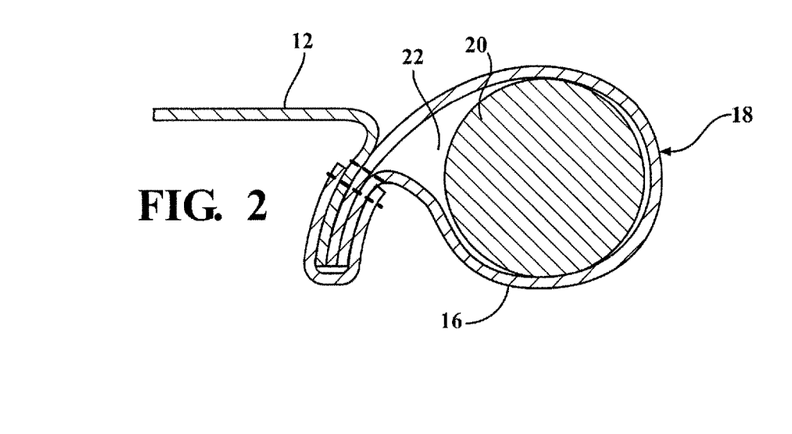
FIG. 2 is a cross-sectional view of the launch and landing pad taken along the line 2-2 in FIG. 1.

As shown in FIGS. 1 and 2, the launch and landing pad 10 includes a surface member 12 that forms a base or main body of the pad. The surface member may be made of a textile or flexible plastic material such as polyester, or other similar flexible or semi-flexible material, although the material alternatively may be generally rigid. The shape of the surface member 12 is not particularly limited, and the surface member may have an elliptical shape such as an ellipse or circle, an oval shape, a round shape or other similar curved shape. However, the surface member alternatively may have a quadrilateral shape such as a rectangle or square, or a polygonal shape. Regardless of the shape of the surface member, the surface member may generally be planar in an unfolded disposition. The surface member may also include a centrally disposed locating mark 14 such as a letter "H" or other similar heliport marking(s) to aid in positioning a drone during launch and landing. Additionally, the surface member may include compass heading markings.

The surface area of a side (e.g., top side) of the surface member 12 of the pad may exceed the thrust diameter of a drone that is disposed on or above the top side of the pad. Drone thrust is the amount of upward force provided by the rotors of the drone moving air in a downward direction underneath the drone. The thrust diameter of the drone is the area under the drone that is exposed to the flow of air produced by the drone's rotors (or other similar propulsion mechanism) in a downward direction when the drone is operated. In other words, the thrust diameter is an area of downwardly moving air produced by the drone when it is operated. When a drone is on or near a ground surface during launch or landing, the downward flow of air from the drone's rotors can undesirably move debris or other objects that lie on the ground surface. The amount of thrust provided by the drone's rotors of course must be sufficient to at least overcome the gravitational force urging the weight of the drone in a downward direction. Otherwise, the drone would not be able to lift off the ground and fly. Any additional amount of thrust provided by the rotors determines how fast the drone can move and how easily the drone can be maneuvered, including how well the drone can counteract other forces such as those caused by wind. For good lift, speed, and maneuverability, typically the maximum amount of thrust provided by a drone's rotors in aggregate should be approximately twice the total weight of the drone. A higher thrust-to-weight ratio will provide even better speed and maneuverability, while a lower ratio will result in decreased performance (down to a ratio of one, at which point the thrust of the rotors would not provide sufficient thrust to lift the drone). While a drone theoretically may have any number of rotors greater than one (e.g., two, three, four, or six rotors), a common drone design is a quadcopter having four rotors, and thus four points of thrust and balance. In order to balance the angular momentum and to keep the drone from spinning uncontrollably, two of the rotors spin in a clockwise direction and the other two rotors spin in a counterclockwise direction. To turn the drone, tilt the drone, or to move the drone from its position during flight (forward, backward, left, or right), the speed of two of the rotors is adjusted relative to the speed of the other two rotors.

The surface member 12 of the pad provides a clean upper surface area that is greater in dimension (diameter, width, area, etc.) than the thrust diameter of the drone, so that, for example, a lens of a camera mounted on the drone will remain clean when the drone is launched from or landed on the pad 10. In other words, the pad 10 is sized so that the downward, outward thrust of air from a fan, rotor, propeller, engine, or other propulsion mechanism of the drone may not move air beyond the perimeter of the pad, when the drone is generally centered on or above the pad. For example, the diameter of the circular pad 10 (e.g., two, three, five, or eight feet, or any diameter in that range) may be longer/wider than any linear distance across an area of the flow of air generated by the drone in a downward direction towards the pad. Alternatively, in a case that the pad is an ellipse, the length of the major and minor axes of the pad may be greater than a width of (or any other linear distance across) the area of flow of air generated by the drone. Thus, the thrust of the drone upon takeoff and landing does not move any debris (dirt, sand, pebbles, stones, grass, small objects, and the like) that lies outside the clean surface of the pad, and the pad remains clean so that no debris comes into contact with the drone. In addition to protecting any camera mounted on the drone, this feature may also protect the working parts of the drone such as the rotors and motor bearings from damage that could be caused by tall grass in the launch/landing area or by debris that could be "kicked up" during launch or landing.

The surface member 12 has an outer peripheral edge portion 16 that outlines the shape of the surface member. An endless weighted perimeter 18 is disposed along the outer peripheral edge of the surface member. The endless weighted perimeter 18 provides the pad 10 with substantial weight in an amount of pounds. For example, the material forming the surface member 12 may be a lightweight material, and the endless weighted perimeter 18 may have a weight in the range of 1.5 to 42 pounds. The weight of the endless weighted perimeter may vary depending on the size of the surface member 12. For example, a pad having a diameter of 2 feet may have an endless perimeter having a weight of 1.5 pounds, a pad having a diameter of 3 feet may have an endless perimeter having a weight of 3.2 pounds, a pad having a diameter of 5 feet may have an endless perimeter having a weight of 8 pounds, and so on. In any event, the weight and disposition of the endless weighted perimeter 18 holds the pad against any ground surface and inhibits movement of the pad due to wind, drone thrust, and the like. The endless weighted perimeter 18 also maintains the position of the surface member 12 when the pad 10 is in use without the need for separate securing member(s) such as stakes or similar to hold the pad in place on the ground. Because the pad 10 does not need to be staked or held to the ground by a separate member, the endless weighted perimeter also allows the pad 10 to be easily moved from one location to another, as described in more detail below. The endless weighted perimeter 18 may be flexible, however the endless weighted perimeter may also have at least a degree of rigidity in order to maintain the shape of the pad 10 during use, and the endless weighted perimeter alternatively may be generally rigid. The weight of the endless perimeter holds the pad in place, but with the surface member and endless perimeter having flexibility characteristics, the pad 10 becomes collapsible. Being collapsible, the pad can be easily folded for storage and unfolded for use.

For example, as shown in FIG. 2 the endless weighted perimeter 18 may include an endless frame member formed of a wire cable rope 20 such as a flexible steel cable rope hoop, spring steel, a zinc-coated flexible metallic hoop, or similar endless metallic or non-metallic cable rope material that is capable of being bent and folded but returns to its original disposition when released. In one embodiment, the endless weighted perimeter of the launch and landing pad may include a galvanized steel wire cable rope formed into a circular hoop by swaging both ends of the cable together. The wire cable rope may be a special purpose rope that is woven with thin wire strands around a core wire that moves within the strands, making the wire cable rope flexible, namely a stranded carbon steel wire rope as described in ASTM A1023/A1023M (see ASTM International Designation: A1023/A1023M-09$^{e1}$). More particularly, the wire cable rope may be comprised of multiple outer layers of helically wound wires wrapped around a multi-wire core (for example, a 6 wire core). The outer layers and the core move independently from one another to deliver the flexible properties of the wire cable rope and to act as a mechanism providing unique properties to the rope. The lay direction of the helically wound wires preferably is a right regular lay to allow the wire cable rope to twist into concentric circles for compact storage. The right regular lay stranded carbon steel wire rope, when swaged into a continuous hoop, wants to lay flat in its resting state yet also hug the contours of the earth with all the wires acting with one another to remain next to the earth. The helically wound endless wire cable rope hoop used in the launch and landing pad is flexible and exhibits its mechanical function of multiplying the force exerted by the hoop relative to its weight at any point around the hoop (mechanical tensile multiplier) when thrust attempts to lift that point above the ground. Further, wire cable rope has a round, aerodynamic shape, is much heavier than flat bands, and has a tensile strength factor that urges the hoop to stay flat with the entire weight of the hoop focused at whatever point the thrust from a drone passing over the edge of the pad hits the pad. Being aerodynamic in shape, the wire cable rope meets the thrust from the drone approaching or moving away from a pad can at angles ranging from 90 degrees to the ground surface on which the pad rests all the way to an approximately 10 degree angle to the surface, and disperses the thrust evenly down both sides of its round profile to equalize pressure to keep the pad from lifting up off the ground and/or flipping over. At rest, a wire cable rope hoop wants to lay flat on the surface of the earth or other ground surface on which the pad is placed. The wire cable rope hoop is a mechanical device with wires that flex and move as thrust from a drone engages it. When a thrust force engages an edge of the wire cable rope hoop to try to lift it up, the weight of the hoop at that point is multiplied by the tensile strength factor of the wire cable rope wanting to remain flat. This multiplied weight factor allows the launch and landing pad to be much lighter while still being able to withstand the thrust from a drone and stay in place. Too heavy of a launch and landing pad would be too burdensome to carry and deploy. Thus, the aerodynamic shape of the wire cable rope hoop dissipates thrust from a drone and the tensile strength factor of the wire cable rope hoop allows the hoop to be lighter in weight while still resisting being lifted off the ground. Also, the wire cable rope hoop can be twisted into concentric circles for compact storage. The combined features of a pad that is large enough to exceed the thrust area of a drone and also maintain its position without a securing member inserted in the ground, while being lightweight so as to be easily carried and moved to another position, are unique to the present pad. Also, the unexpected result of using a wire cable rope that allows the launch and landing pad to be folded into smaller concentric rings for storage is that when unfolded and deployed on a ground surface for use, the pad remains significantly secure on the ground without any separate securing member being inserted into the ground, even when the pad is subjected to wind or various angles of thrust produced by a drone passing over the pad.

The peripheral edge portion 16 may include a separate piece of material, and the wire cable rope 20 may be joined to the surface member 12 by folding the separate piece of material around the wire cable rope and sewing the folded material to the perimeter of the surface member to form a sealed pocket 22 that retains the wire cable rope, yet allows the wire cable rope to flex, twist and move within the pocket. Alternatively to sewing, the pocket may be formed by adhering or otherwise attaching the peripheral edge portion to itself, for example using glue or other adhesive, snaps, or a hook-and-loop type fastener. The separate piece of material forming the pocket 22 may be a protective material that is more durable and less likely to snag or tear in comparison to a woven textile or alternatively may be the same material as the surface member. Also, an additional protective layer of a material different than the material of the surface member may be sewn or otherwise attached to the outside of the peripheral edge portion to improve the durability of the pad. In yet another alternative, the wire cable rope may be joined to the surface member by simply folding the perimeter of the surface member around the cable rope and sewing or otherwise attaching the surface member to itself to form the sealed pocket.

In yet another alternative, the endless weighted perimeter may be integrally formed with the surface member, such as by injection molding a rubber compound that would encase the wire cable rope hoop.

Figure 3:
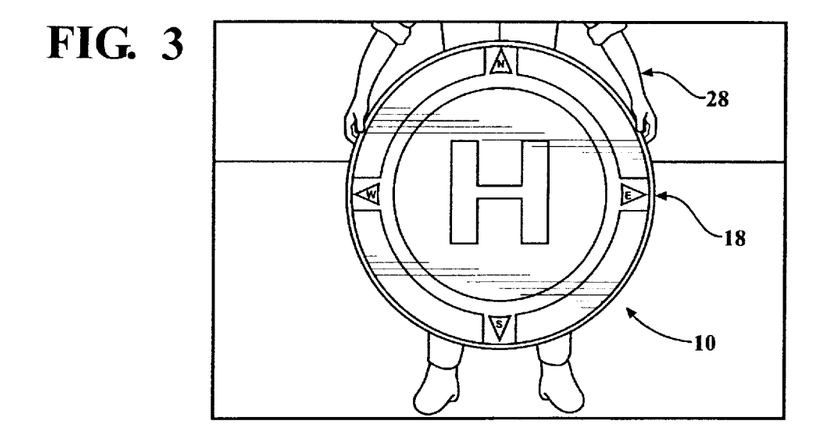
FIG. 3 is an environmental view of a user holding the launch and landing pad of FIG. 1 in a vertical position to begin collapsing the pad.
Figure 4:
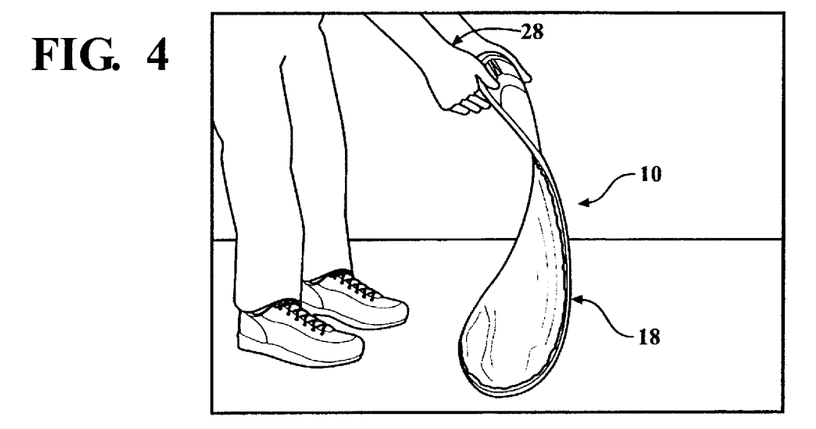
FIG. 4 is an environmental view of the user beginning to collapse the launch and landing pad from the unfolded, use disposition into a collapsed, storage disposition by bending the pad.
Figure 5:
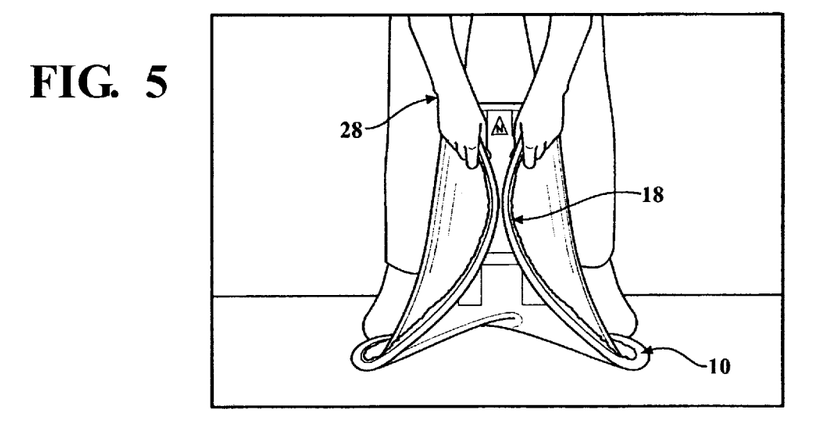
FIG. 5 is an environmental view of the user twisting the bent launch and landing pad.
Figure 6:
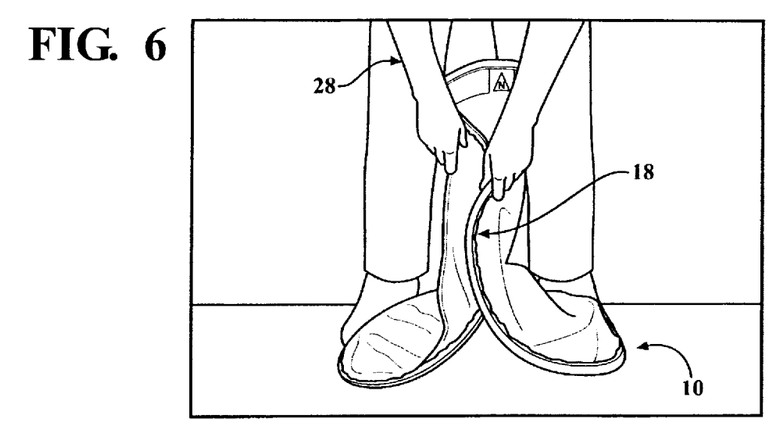
FIG. 6 is an environmental view of the user further twisting the launch and landing pad so that one side of the pad overlaps another side.
Figure 7:
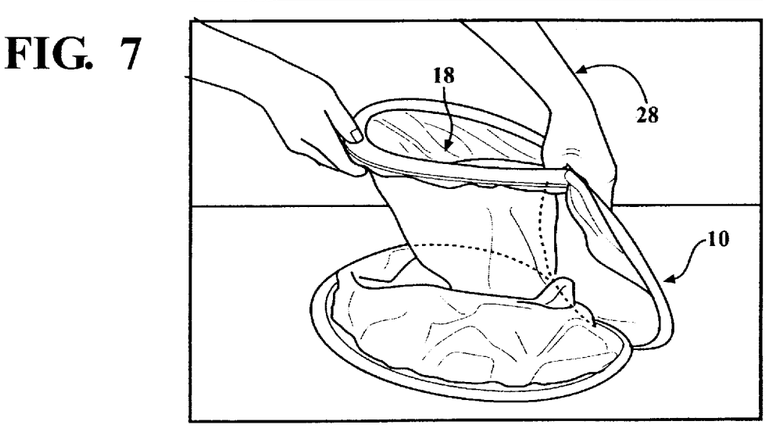
FIG. 7 is an environmental view of the user beginning to fold the bent and twisted pad into smaller shapes.
Figure 8:
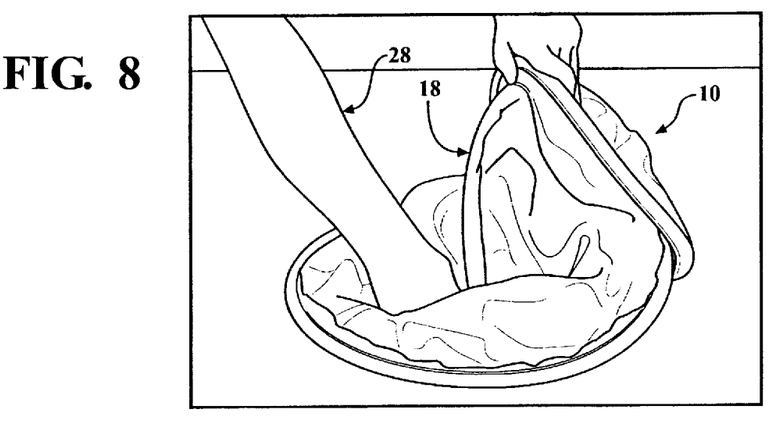
FIG. 8 is an environmental view of the user continuing to fold the launch and landing pad.
Figure 9:
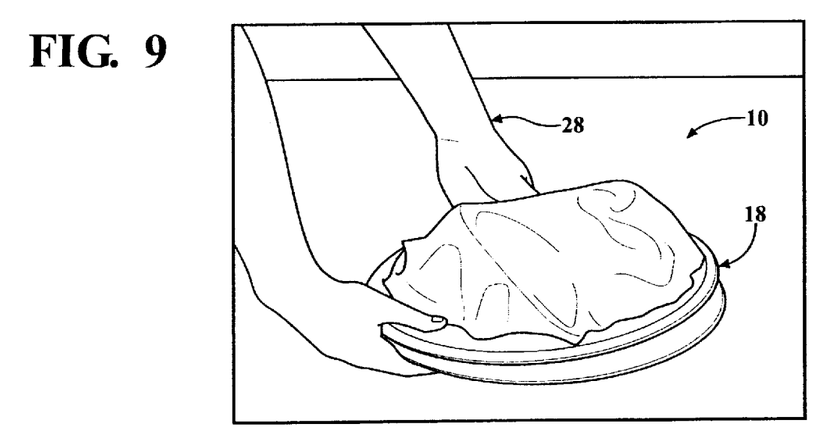
FIG. 9 is an environmental view of the launch and landing pad folded into the collapsed, storage disposition.
Figure 10:
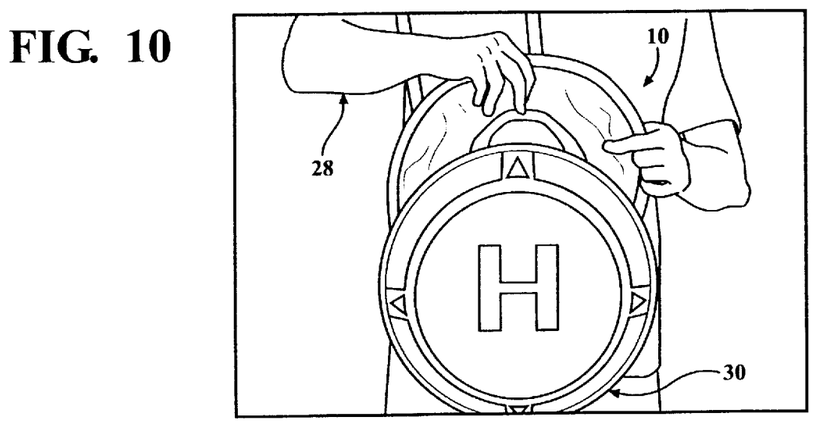
FIG. 10 is an environmental view of the user inserting the collapsed launch and landing pad into a storage bag.
Figure 11:
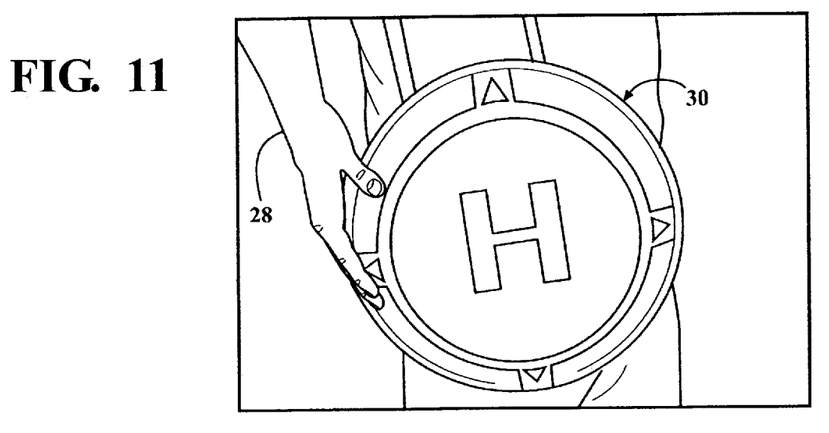
FIG. 11 is an environmental view of the user carrying the storage bag for transport of the collapsed launch and landing pad.

The endless weighted perimeter 18 may provide for simple and easy storage and deployment of the pad 10. For example, the endless weighted perimeter may be collapsible (e.g., wire cable rope) to allow the pad to be folded from an unfolded use disposition, in which the surface member is deployed to its full size, into a storage disposition that is a fraction (generally $\frac{1}{3}^{rd}$, depending on the shape) of the size of the pad in the unfolded use disposition. The precise method of collapsing the pad may vary depending upon the size of the pad. However, in the case that the endless weighted perimeter includes a wire cable rope, collapsing or folding the pad 10 for storage requires two main steps, the first step including bending and twisting the endless weighted perimeter 18 and the second step including folding the twisted endless weighted perimeter into a plurality of similar shapes that are smaller than the original fully open shape of the pad. For example, turning to FIG. 3, in order to collapse the pad 10 a user 28 picks the pad up with both hands and grasps the endless weighted perimeter 18 with arms extended so that his or her hands are as far apart as possible and the pad is disposed generally vertical with respect to the ground. Next, as shown in FIGS. 4-6, the user 28 manipulates the pad 10 by pulling both hands towards each other to bend and twist the endless weighted perimeter from its original full single shape to a tubular-like shape in which part of the upper surface of the pad 10 overlaps part of the lower surface of the pad. Then, as shown in FIGS. 7-9, the user 28 folds the twisted endless weighted perimeter over itself into two or more smaller, similar shapes by folding end portions of the twisted pad underneath the overlapping center portion to completely collapse the pad 10. For example, twisting and folding the endless weighted perimeter may collapse the pad from its original large circular shape (e.g., a circle having a diameter of three feet) into three smaller circular shapes that are a fraction of the original size of the pad 10 as shown in FIG. 9 (e.g., three smaller circles each having a diameter of thirteen inches). Once in the collapsed (folded) storage disposition, the pad 10 may be inserted into and stored in a storage bag 30 as shown in FIG. 10. Alternatively, the pad may be held in the collapsed disposition by being tied, strapped or otherwise secured with any suitable fastener. The storage bag 30 may include a handle and/or a shoulder strap that allows for easy carrying and transport of the storage bag and collapsed pad as shown in FIG. 11.

The pad 10 is also easily deployable for use. When the pad 10 is removed from the storage bag 30 by the user, the pad is unfolded by releasing it from its folded storage disposition and opening the endless weighted perimeter back to its original, deployed use disposition. More specifically, the pad may be released from the storage disposition by the user unfolding the pad and removing his or her grip on the pad, whereby the endless frame member is returnable to its original unfolded single shape to place the launch and landing pad in the use disposition. In the case that the endless weighted perimeter is the aforementioned wire cable rope material, the pad may spring back to its unfolded shape without user assistance. Once in the use disposition, the pad may be positioned and repositioned by hand by the user grasping the pad at the perimeter and placing, tossing or throwing the pad onto various surfaces, thereby easily transporting the pad. The endless weighted perimeter is heavy enough to keep the pad in a single position, but it is also light enough that a user is able to easily pick the pad up and reposition it. The weighted endless perimeter moves along with the pad allowing for deployment and securement of the pad on grass, dirt, roads, cement, a floor, a tarmac, and the like. The pad may also conform to non-flat and/or uneven terrain.

Once the pad 10 is deployed onto a surface in its use disposition, the user may place a drone on top of the pad. The locating mark 14 may aid the user in centering the drone on the pad. The user can then launch the drone from the pad. The user may leave the pad in place for later landing of the drone. If the drone is equipped with a GPS feature, the drone may return to the same location for landing. However, the drone GPS may be slightly inaccurate by a few feet, and as the drone approaches the pad for landing, it may be necessary for the user to adjust the positioning of the pad. As described above, the pad is quickly and easily repositioned by the user simply lifting the pad off the ground and tossing or placing the pad in another location. Also, if the drone does not have a GPS feature, if the drone's GPS intermittently fails, or if the sudden need for a quick "emergency" landing arises, the user can easily move the pad to any other location for landing of the drone. In the case that the user manually lands the drone, the locating mark 14 can be used as a guide to bring the drone down onto the center of the pad. When the user is finished using the pad, the user can return the pad to the storage disposition.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A transportable launch and landing pad for drones, said pad comprising:
   a round surface member for supporting a drone on a ground surface; said surface member including an endless flexible weighted ground surface contacting, engaging and conforming perimeter disposable on the flat or undulating topography of the ground surface, said endless flexible weighted ground surface contacting, engaging and conforming perimeter having a round profile and being formed of a stranded carbon steel wire rope that is comprised of multiple outer layers of helically wound wires wrapped around a multi-wire core, the outer layers and the core moving independently from one another,
   said surface member having a diameter establishing an area of said pad that is greater than any linear distance across an area of downwardly moving air of the drone when operated, and said round profile of said wire rope equalizingly dispersing drone thrust pressure;
   wherein said pad maintains a position on the ground surface without any separate securing member inserted into the ground, and said pad is not lifted from the ground surface by air from the thrust of the drone during approach and departure of the drone relative to the pad.

2. A transportable launch and landing pad for drones, said pad comprising:
   a flexible base for supporting a drone on a ground surface, said base having a perimeter; and
   an endless frame member joined to the perimeter of said base;
   said base having a surface area that has a width that is greater than any linear distance across an area of downwardly moving air of the drone when operated;
   said endless frame member being weighted, and having a round profile and being formed of a stranded carbon steel wire rope that is comprised of multiple outer layers of helically wound wires wrapped around a multi-wire core, the outer layers and the core moving independently from one another, and said round profile of said wire rope equalizingly dispersing drone thrust pressure;
   wherein said endless frame member holds said pad in place on the ground surface, and said endless frame member is collapsible to fold said pad for storage and releasable for use of said pad.

3. The launch and landing pad of claim 2, wherein said flexible base has one of a round shape and an elliptical shape.

4. The launch and landing pad of claim 2, wherein said flexible base is generally planar in an unfolded use disposition while also being conformable to any topography.

5. The launch and landing pad of claim 2, wherein said flexible base is one of a textile material and a flexible plastic material.

6. The launch and landing pad of claim 2, wherein said endless frame member is retained in a pocket formed by the perimeter of said flexible base, allowing said endless frame member to flex, twist and move within the pocket.

7. The launch and landing pad of claim 2, wherein said endless frame member is collapsible from an unfolded use disposition to a storage disposition that is a fraction of a size of the unfolded disposition.

8. A method of storing and deploying a transportable launch and landing pad for drones, said method comprising the steps of:
   providing the launch and landing pad including a flexible base for supporting a drone on a ground surface, said base having a perimeter, and an endless frame member joined to said perimeter of said flexible base, said base having a surface area that has a width that is greater than any linear distance across an area of downwardly moving air of the drone when operated, said endless frame member being weighted and collapsible, said endless frame member having a round profile, said endless frame member being formed of a stranded carbon steel wire rope that is comprised of multiple outer layers of helically wound wires wrapped around a multi-wire core, the outer layers and the core moving independently from one another, and said round profile of said wire rope equalizingly dispersing drone thrust pressure;
   manipulating said launch and landing pad from an unfolded use disposition to a storage disposition by twisting said endless frame member and folding the twisted endless frame member over itself from a single shape into two or more smaller, similar shapes; and
   releasing said launch and landing pad from the folded storage disposition, whereby said endless frame member is returnable to the single shape to place said launch and landing pad in the unfolded use disposition.

9. The method of claim 8, further including the step of: inserting the folded launch and landing pad into a storage bag.

10. The method of claim 8, further including the steps of: grasping said launch and landing pad at said perimeter; and tossing said launch and landing pad onto a surface.

11. The method of claim 10, further including the steps of: repositioning said launch and landing pad by removing said launch and landing pad from said surface and tossing said launch and landing pad into another location.

* * * * *